US010187775B2

(12) United States Patent
Tanabe et al.

(10) Patent No.: US 10,187,775 B2
(45) Date of Patent: Jan. 22, 2019

(54) MOBILE COMMUNICATION DEVICE INCLUDING FIRST AND SECOND COMMUNICATORS, CONTROL METHOD, AND NON-TRANSITORY STORAGE MEDIUM

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/488,693

(22) Filed: Apr. 17, 2017

(65) Prior Publication Data

US 2017/0303107 A1  Oct. 19, 2017

(30) Foreign Application Priority Data

Apr. 18, 2016  (JP) .................. 2016-083233

(51) Int. Cl.
*H04W 4/90* (2018.01)
*H04W 4/80* (2018.01)
*H04W 4/02* (2018.01)

(52) U.S. Cl.
CPC ............. *H04W 4/90* (2018.02); *H04W 4/027* (2013.01); *H04W 4/80* (2018.02)

(58) Field of Classification Search
None
See application file for complete search history.

(56) References Cited

U.S. PATENT DOCUMENTS 5,337,041 A * 8/1994 Friedman ........... G08B 21/0216
340/539.1
2005/0075116 A1* 4/2005 Laird ....................... A61B 5/04
455/456.3

(Continued)

FOREIGN PATENT DOCUMENTS

JP  2011-151751 A  8/2011

*Primary Examiner* — German Viana Di Prisco
(74) *Attorney, Agent, or Firm* — Hauptman Ham, LLP

(57) ABSTRACT

A mobile communication device comprises: a first communicator configured to perform short range wireless communication with a first communication device not via another device; a second communicator configured to perform wireless communication with the first communication device via another device; an acceleration sensor configured to detect an acceleration; and at least one controller configured to, when it is determined that a travelling means of a user of the mobile communication device is changed from walking to a vehicle based on the acceleration detected by the acceleration sensor, cause the second communicator to notify the first communication device of an alarm when a notification condition is established, and cause the second communicator not to notify the first communication device of the alarm when the notification condition is not established, wherein the notification condition includes a condition that communication between the first communicator and the first communication device is disconnected.

17 Claims, 6 Drawing Sheets

(56) References Cited

U.S. PATENT DOCUMENTS

| | | | |
|---|---|---|---|
| 2005/0156759 A1* | 7/2005 | Aota | G08G 1/202 |
| | | | 340/994 |
| 2008/0122655 A1* | 5/2008 | Sedelius Horberg | G08B 25/01 |
| | | | 340/984 |
| 2009/0132197 A1* | 5/2009 | Rubin | H04M 1/72563 |
| | | | 702/141 |
| 2009/0207014 A1* | 8/2009 | Ayed | G08B 13/1427 |
| | | | 340/539.13 |
| 2013/0005357 A1* | 1/2013 | Takahashi | G01S 19/34 |
| | | | 455/456.1 |
| 2016/0057268 A1* | 2/2016 | Jiang | H04B 5/00 |
| | | | 455/556.1 |
| 2016/0063849 A1* | 3/2016 | Hasegawa | H04M 19/04 |
| | | | 340/539.32 |
| 2017/0213433 A1* | 7/2017 | Qin | G08B 13/1436 |

* cited by examiner

| ACCELERATION PATTERN | STATE | TYPE OF TRAVELLING MEANS |
|---|---|---|
| PATTERN P1 | STATIONARY STATE | - |
| PATTERN P2 | TRAVELLING STATE BY WALKING | WALKING |
| PATTERN P3 | | RUNNING |
| PATTERN P4 | TRAVELLING STATE BY VEHICLE | AUTOMOBILE |
| PATTERN P5 | | MOTORCYCLE |
| PATTERN P6 | | BUS |
| PATTERN P7 | | TRAIN |
| PATTERN P8 | | AIRPLANE |
| PATTERN P9 | | BICYCLE |

MOBILE COMMUNICATION DEVICE INCLUDING FIRST AND SECOND COMMUNICATORS, CONTROL METHOD, AND NON-TRANSITORY STORAGE MEDIUM

CROSS-REFERENCE TO RELATED APPLICATION

The present application claims priority to and incorporates by reference the entire contents of Japanese Patent Application No. 2016-083233 filed in Japan on Apr. 18, 2016.

FIELD

The present application relates to a mobile communication device, a control method, and a non-transitory storage medium.

BACKGROUND

As a mobile communication device for a protected person such as a child who need to be protected, there has been a mobile communication device having incorporated therein various types of security functions for preventing the protected person from encountering crimes such as abduction.

There is room for improvement with regard to the security functions of the mobile communication devices for the protected person.

SUMMARY

The present application relates to a mobile communication device, a control method, and a non-transitory storage medium.

According to one aspect, there is provided a mobile communication device comprising: a first communicator configured to perform short range wireless communication with a first communication device not via another device; a second communicator configured to perform wireless communication with the first communication device via another device; an acceleration sensor configured to detect an acceleration; and at least one controller configured to, when it is determined that a travelling means of a user of the mobile communication device is changed from walking to a vehicle based on the acceleration detected by the acceleration sensor, cause the second communicator to notify the first communication device of an alarm when a notification condition is established, and cause the second communicator not to notify the first communication device of the alarm when the notification condition is not established, wherein the notification condition includes a condition that communication between the first communicator and the first communication device is disconnected.

According to one aspect, there is provided a communication method executed by a mobile communication device including a first communicator configured to perform short range wireless communication with a first communication device not via another device, a second communicator configured to perform wireless communication with the first communication device via another device, and an acceleration sensor configured to detect an acceleration, the communication method comprising, when it is determined that a travelling means of a user is changed from walking to a vehicle based on the acceleration detected by the acceleration sensor, causing the second communicator to notify the first communication device of an alarm when a notification condition is established, and causing the second communicator not to notify the first communication device of the alarm when the notification condition is not established, wherein the notification condition includes a condition that communication between the first communicator and the first communication device is disconnected.

According to one aspect, there is provided non-transitory storage medium that stores a control program for causing, when executed by a mobile communication device including a first communicator configured to perform short range wireless communication with a first communication device not via another device, a second communicator configured to perform wireless communication with the first communication device via another device, and an acceleration sensor configured to detect an acceleration, the mobile communication device to execute, when it is determined that a travelling means of a user is changed from walking to a vehicle based on the acceleration detected by the acceleration sensor, causing the second communicator to notify the first communication device of an alarm when a notification condition is established, and causing the second communicator not to notify the first communication device of the alarm when the notification condition is not established, wherein the notification condition includes a condition that communication between the first communicator and the first communication device is disconnected.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Embodiments for a mobile communication device, a control method, and a control program according to the present application will be described below in detail with reference to the accompanying drawings. In the following descriptions, a mobile phone is described as an example of the mobile communication device.

Figure 1:
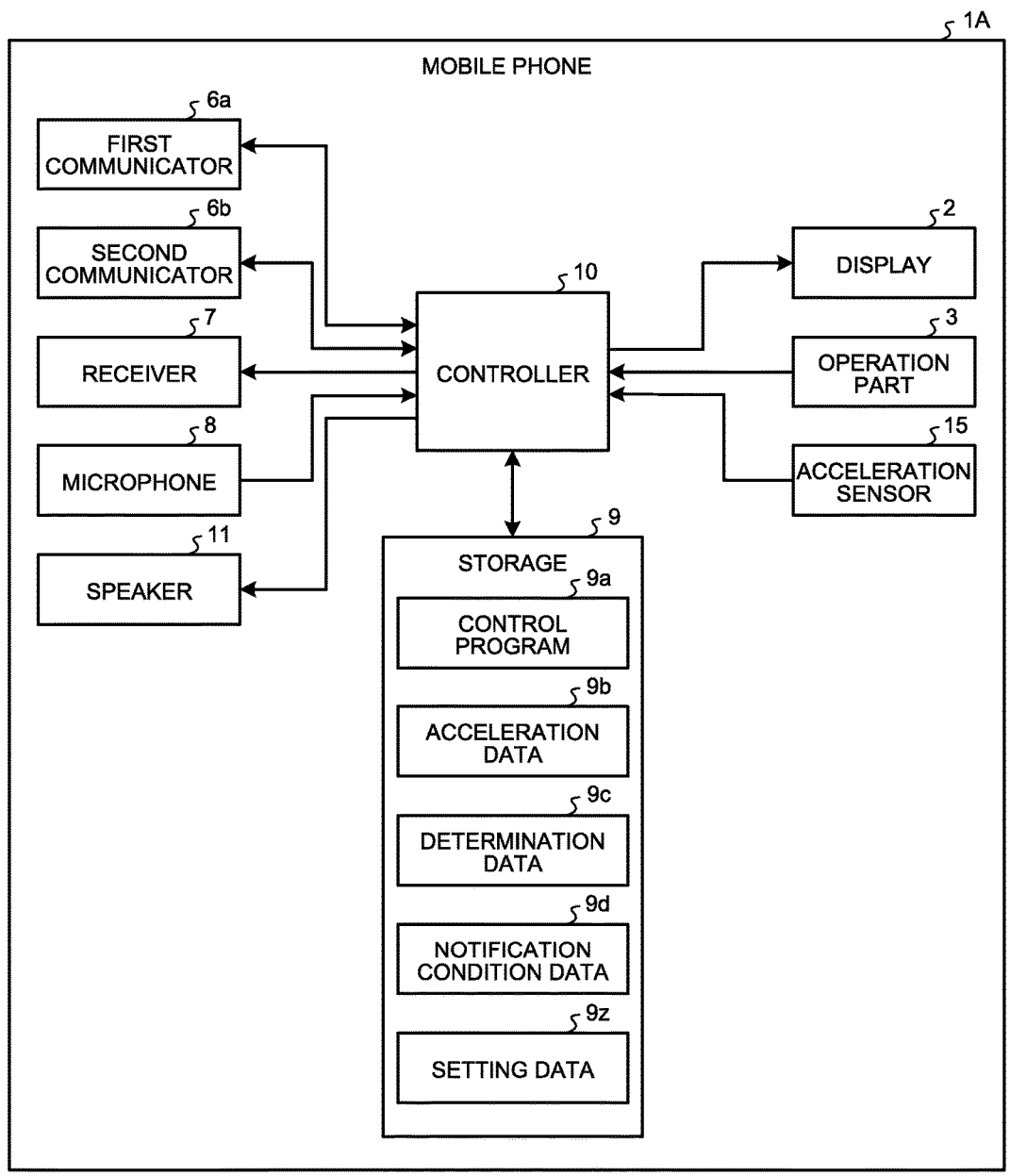
FIG. 1 is a block diagram of a mobile phone according to embodiments.

FIG. 1 is a block diagram of a mobile phone according to embodiments. As illustrated in FIG. 1, a mobile phone 1A includes a display 2, an operation part 3, a first communicator 6a, a second communicator 6b, a receiver 7, a microphone 8, a storage 9, a controller 10, a speaker 11, and an acceleration sensor 15. The mobile phone 1A is a mobile communication device for a protected person, such as a child or an elderly person who need to be protected.

The display 2 includes a display panel such as a liquid crystal display or an organic electro-luminescence display. The display 2 displays information such as characters, figures, and images in accordance with a signal from the controller 10. Examples of the information displayed on the display 2 include, but are not limited to, a screen for notification, an icon, etc.

The operation part 3 includes one or a plurality of devices for receiving user's operations. Examples of the device for receiving the user's operations include, but are not limited to, a key, a button, a touchscreen, etc. The operation part 3 inputs a signal in accordance with the received operation from the user to the controller 10.

The first communicator 6a is configured to perform communication, such as transmission and reception of data and calling through short range wireless communication. Examples of the communication standards of short range wireless communication supported by the first communicator 6a include, but are not limited to, IEEE802.11, Bluetooth (registered trademark), IrDA (Infrared Data Association), NFC (Near Field Communication), WPAN (Wireless Personal Area Network), etc. Examples of the communication standards of the WPAN include, but are not limited to, ZigBee (registered trademark), etc. The first communicator 6a can support one or plural communication standards described above.

The first communicator 6a has a function of FeliCa (registered trademark). With the FeliCa (registered trademark) function, the first communicator 6a can perform data communication with, for example, an automatic ticket gate device at a gate in a station, an external device for fare processing provided in a bus, and an external device for a boarding procedure on an airplane. Although the first communicator 6a according to the present embodiment has the FeliCa (registered trademark) function, it is also possible to omit the FeliCa (registered trademark) function depending on the function to be performed.

The second communicator 6b performs wireless communication. The second communicator 6b performs the wireless communication for transmission and reception of data and calling through a network such as a public line network 200 (see FIG. 4). The communication method supported by the second communicator 6b is wireless communication standards. For example, the wireless communication standards are 2G, 3G, and 4G cellular phone communication standards, etc. Examples of the cellular phone communication standards include, but are not limited to, LTE (Long Term Evolution), W-CDMA (Wideband Code Division Multiple Access), CDMA2000, PDC (Personal Digital Cellular), GSM (Global System for Mobile Communications, registered trademark), PHS (Personal Handy-phone System), etc. The second communicator 6b can support one or plural communication standards described above.

The second communicator 6b receives GPS signals in a predetermined frequency band from GPS satellites, performs a demodulation process for the received GPS signals, and transmits processed signals to the controller 10. In the mobile phone 1A, the function for communicating with the GPS satellites may be separated from the second communicator 6b, so as to provide an individual communicator independent from the second communicator 6b.

Each of the receiver 7 and the speaker 11 is a sound output module. Each of the receiver 7 and the speaker 11 outputs a sound signal from the controller 10 as sound. The receiver 7 is used for outputting a voice of a partner on calling, for example. The speaker 11 is used for outputting a ringtone and music, for example. One of the receiver 7 and the speaker 11 may also execute functions of the other. The microphone 8 is a sound input module. The microphone 8 converts a voice of a user and the like to a sound signal and inputs the sound signal to the controller 10.

The storage 9 stores therein programs and data. The storage 9 is also used as a work area in which processing results of the controller 10 are temporarily stored. The storage 9 can include a semiconductor storage medium and a non-transitory storage medium such as a magnetic storage media. The storage 9 can include plural types of storage medium. The storage 9 can include a combination of a portable storage medium such as a memory card, an optical disk, or a magnetooptical disk and a reader of the storage medium. The storage 9 can include a storage device that is used as a temporary storage area such as a RAM (Random Access Memory).

The storage 9 stores therein a control program 9a, acceleration data 9b, determination data 9c, notification condition data 9d, and setting data 9z, for example. The control program 9a provides functions related to various types of control for operating the mobile phone 1A. The acceleration data 9b includes information indicating acceleration that acts on the mobile phone 1A. The determination data 9c includes information used for determination of a state of the mobile phone 1A. The notification condition data 9d includes information as a condition for causing the mobile phone 1A to notify another mobile phone 1B of an alarm (see FIG. 4), when a traveling means of the user of the mobile phone 1A is changed from walking to a vehicle. The setting data 9z includes information related to various types of settings related to operations of the mobile phone 1A.

The control program 9a provides the functions related to the various types of control for operating the mobile phone 1A. For example, the control program 9a controls the second communicator 6b, the receiver 7, the microphone 8, and the like to establish a call. The functions provided by the control program 9a include a function of determining the state of the mobile phone 1A based on the acceleration by controlling the acceleration sensor 15 and the like, a function of determining a type of a vehicle as a travelling means based on the state of the mobile phone 1A, and a function of determining a change of the travelling means of the user of the mobile phone 1A from walking to a vehicle. The state of the mobile phone 1A and the travelling means of the user are described later. The functions provided by the control program 9a include a function of, when it is determined that the travelling means of the user of the mobile phone 1A is changed from walking to a vehicle, causing the second communicator 6b to notify the other mobile phone 1B of an alarm when the notification condition stored in the notification condition data 9d is established, and causing the second communicator 6b not to notify the other mobile phone 1B of the alarm when the notification condition is not established. The notification condition is described later.

In the acceleration data 9b, plural pieces of acceleration information are stored in a time series manner. The acceleration information includes items such as a time and an acceleration value. The time indicates a time of detecting the acceleration by the acceleration sensor 15. The acceleration value indicates a value of the acceleration detected by the acceleration sensor 15. The determination data 9c and the notification condition data 9d are described later.

The controller 10 is an arithmetic processing device. Examples of the arithmetic processing unit can include, but are not limited to, a CPU (Central Processing Unit), an SoC (System-on-a-Chip), an MCU (Micro Control Unit), an FPGA (Field-Programmable Gate Array), etc. The controller 10 integrally controls the operations of the mobile phone 1A to realize various types of the functions.

Specifically, the controller 10 executes commands included in the programs stored in the storage 9 while referring to the data stored in the storage 9 as necessary. The controller 10 then controls function modules in accordance with the data and the commands to realize various types of the functions. Examples of the function modules include, but are not limited to, the display 2, the first communicator 6a, the second communicator 6b, the receiver 7, the speaker 11, etc. The controller 10 may change control in accordance with a result of detection made by a detection module. Examples of the detection module include, but are not limited thereto, the operation part 3, the second communicator 6b, the microphone 8, the acceleration sensor 15, etc. The controller 10 detects the presence of short range wireless communication between the first communicator 6a and another communication device. The controller 10 also has a function of integrating an elapsed time t after disconnection of the short range wireless communication between the first communicator 6a and another communication device. The integrated elapsed time t is stored in a data area (not illustrated) of the storage 9.

The acceleration sensor 15 detects a direction and magnitude of acceleration acting on the mobile phone 1A and outputs a detection result to the controller 10. For example, the acceleration sensor 15 outputs the acceleration in an X-direction, the acceleration in a Y-direction, the acceleration in a Z-direction, and a vector value obtained by synthesizing those accelerations, to the controller 10 as the detection result of the acceleration sensor 15.

Next, the function of determining the state of the mobile phone 1A and the function of determining the type of the vehicle are described.

The mobile phone 1A has a function of determining plural states of the device itself. Examples of the plural states of the mobile phone 1A include, but are not limited to, a stationary state, a travelling state by walking, a travelling state by a vehicle, etc. The stationary state is a state where a user carrying the mobile phone 1A remains stationary or the mobile phone 1A is placed on an object. The travelling state by walking includes a walking state and a running state. The walking state is a state where a user carrying the mobile phone 1A itself is walking. The running state is a state where a user carrying the mobile phone 1A is running. The travelling state by a vehicle is a state where the user carrying the mobile phone 1A is travelling by a vehicle. Examples of the vehicle include, but are not limited to, an automobile, a motorcycle, a train, a bus, an airplane, a bicycle, etc.

Figures 2, 3:
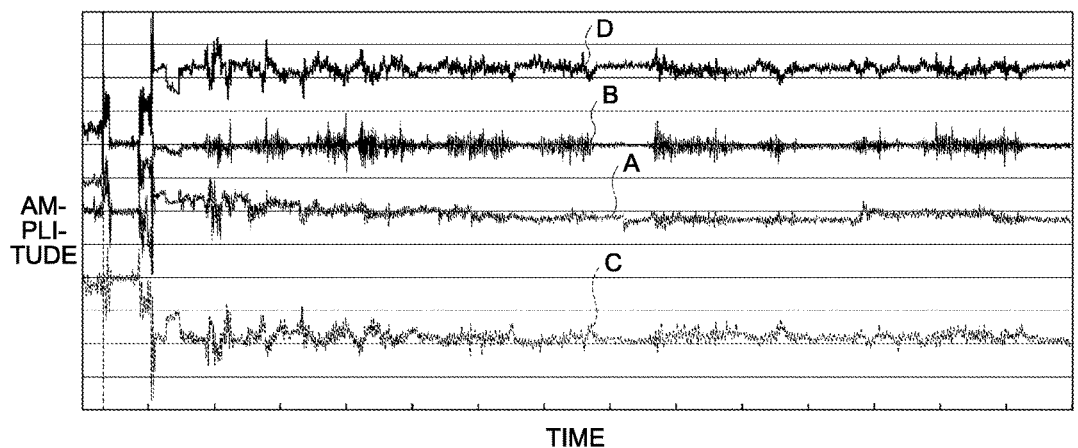
FIG. 2 is a diagram schematically illustrating a detection result of an acceleration sensor.
FIG. 3 is a diagram illustrating an example of configuration of determination data.

FIG. 2 is a diagram schematically illustrating a detection result of the acceleration sensor 15. As illustrated in FIG. 2, the acceleration in the X-direction (measurement data A in FIG. 2), the acceleration in the Y-direction (measurement data B in FIG. 2), the acceleration in the Z-direction (measurement data C in FIG. 2), and the vector value obtained by synthesizing those accelerations (measurement data D in FIG. 2) are output to the controller 10, as the detection result of the acceleration sensor 15. The controller 10 logs the detection result in the acceleration data 9b of the storage 9.

By executing the control program 9a, the controller 10 executes control of analyzing the acceleration data 9b and determining the state of the mobile phone 1A. For example, the controller 10 determines the state of the mobile phone 1A by using data of an acceleration pattern. The acceleration pattern is stored in advance as the determination data 9c of the storage 9, for example.

FIG. 3 is a diagram illustrating an example of configuration of the determination data 9c. The determination data 9c includes the acceleration patterns each of which corresponds to each of the plural states of the mobile phone 1A. The acceleration patterns are characteristically detected patterns which correspond to the states of the mobile phone 1A, and are measured and extracted in advance. The acceleration patterns are stored so as to correspond to the data of the logged synthesized vector value described above.

In the example illustrated in FIG. 3, the determination data 9c includes determination information corresponding to plural states of the mobile phone 1A. The determination information includes items such as the acceleration pattern, the state of the mobile phone 1A, and the type of the travelling means. The determination information of a pattern P1 includes an acceleration pattern corresponding to a stationary state. The determination information of a pattern P2 includes an acceleration pattern which corresponds to walking as the travelling state by walking. The determination information of a pattern P3 includes an acceleration pattern which corresponds to running as the travelling state by walking. Each of the determination information of patterns P4 to P9 includes an acceleration pattern which corresponds to each of the travelling means including an automobile, a motorcycle, a train, a bus, an airplane, and a bicycle, as the travelling state by a vehicle. The determination information of the pattern P8 which corresponds to the airplane may also include an atmospheric-pressure pattern detected by an atmospheric-pressure sensor (not illustrated) at takeoff and landing besides the acceleration pattern.

The controller 10 compares the pattern of the synthesized vector in the acceleration data 9b with the acceleration patterns in the determination data 9c to determine the state which corresponds to the matched acceleration pattern as the state of the mobile phone 1A. The matched acceleration pattern includes an acceleration pattern which perfectly matches the pattern of the synthesized vector and an acceleration pattern which matches the pattern of the synthesized vector at a predetermined ratio.

For example, when the pattern of a synthesized vector in the acceleration data 9b matches the pattern P1 in the determination data 9c, the controller 10 determines that the mobile phone 1A is in a stationary state. For example, when the pattern of the synthesized vector in the acceleration data 9b matches either of the patterns P2 and P3 in the determination data 9c, the controller 10 determines that the mobile phone 1A is in a travelling state by walking (a walking state or a running state). For example, when the pattern of the synthesized vector in the acceleration data 9b matches any of the patterns P4 to P9 in the determination data 9c, the controller 10 determines that the mobile phone 1A is in a travelling state by a vehicle. In this case, the controller 10 determines a type of a type of a vehicle corresponding to the matched acceleration pattern as the type of the travelling means of a user of the mobile phone 1A. The controller 10 may determine when the pattern of the data of the logged synthesized vector value described above does not match any of the patterns of the travelling states as the stationary state, instead of the acceleration pattern of the stationary state.

The controller 10 calculates the number of steps W by walking of the user of the mobile phone 1A, based on the detection result of the acceleration sensor 15. Specifically, the controller 10 sets in advance acceleration values for walking, running, ascending and descending of stairs, and the like of the user from the detection results of the acceleration sensor 15, and calculates the number of the steps W based on the set value. The calculation method of the number of the steps W is not limited to the method described above. The number of the steps W may be calculated by referring to a table in which the detection results of the acceleration sensor 15 are associated with walking, running, ascending and descending of stairs, and the like. Further, walking, running, ascending and descending of stairs, and the like of the user may be determined from a waveform of the detection result of the acceleration sensor 15. The controller 10 integrates the number of the steps W of the user from the disconnection of the short range wireless communication between the first communicator 6a and another communication device. The integrated number of the steps W is stored in a data area (not illustrated) of the storage 9.

Figure 4:
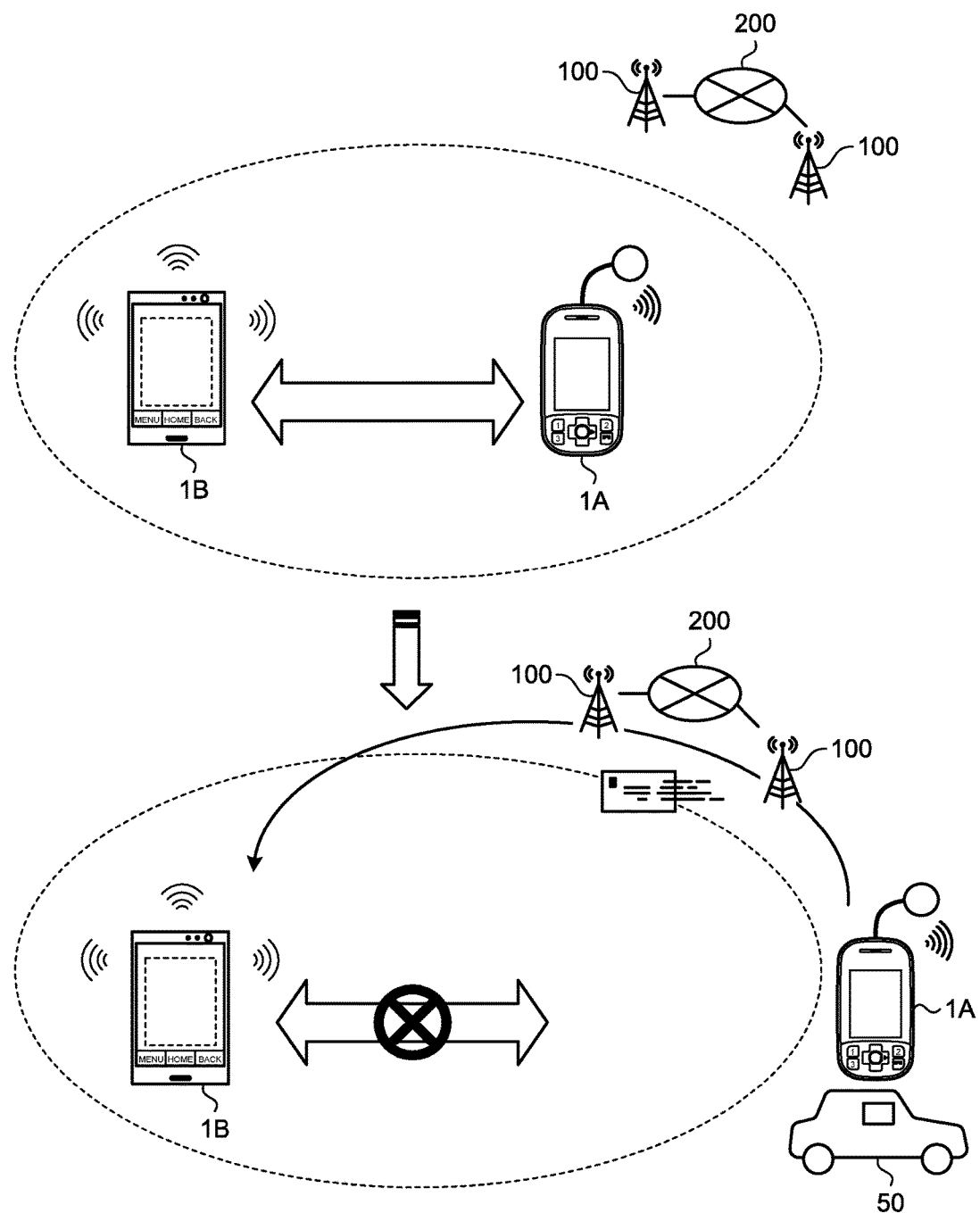
FIG. 4 is a diagram illustrating an outline of a control method carried out by execution of a control program by a controller.

Next, with reference to FIG. 4, there is described an example of control when it is determined that the travelling means of the user as a protected person (hereinafter called simply a protected person) of the mobile phone 1A is changed from walking to a vehicle, based on the acceleration detected by the acceleration sensor 15. FIG. 4 is a diagram illustrating an outline of a control method carried out by execution of the control program 9a by the controller 10.

The mobile phone 1A can perform the short range wireless communication with the mobile phone 1B within an available area of the short range wireless communication (the area surrounded by the broken line in FIG. 4) by the first communicator 6a, not via another device, as indicated with a bidirectional arrow in FIG. 4. Also the mobile phone 1A is connected to the public line network 200 by the second communicator 6b via wireless communication with a base station 100 as another device. The mobile phone 1A can perform the wireless communication through the public line network 200 with the mobile phone 1B by the second communicator 6b. The mobile phone 1B is a mobile phone including a display, an operation part, a communicator, a receiver, a microphone, a storage, a controller, a speaker, and the like (all of which are not illustrated). The mobile phone 1B is assumed to be carried by a protector who protects the protected person who carries the mobile phone 1A.

The controller 10 causes the second communicator 6b to notify the mobile phone 1B of an alarm via the public line network 200 if a notification condition stored in the notification condition data 9d is established when it is determined that the travelling means of the user of the mobile phone 1A is changed from walking (a walking state or a running state) to a vehicle (for example, an automobile 50 illustrated in FIG. 4) based on the acceleration detected by the acceleration sensor 15. The controller 10 does not cause the second communicator 6b to notify the mobile phone 1B of the alarm if the notification condition stored in the notification condition data 9d is not established when it is determined that the travelling means of the user of the mobile phone 1A is changed from walking to a vehicle. The alarm may be an e-mail, or a notification transmitted via a dedicated application program.

The notification condition stored in the notification condition data 9d includes disconnection of short range wireless communication between the first communicator 6a of the mobile phone 1A and the mobile phone 1B as a first notification condition. The controller 10 causes the second communicator 6b to notify the mobile phone 1B of the alarm if the short range wireless communication between the first communicator 6a of the mobile phone 1A and the mobile phone 1B is disconnected when it is determined that the travelling means of the user of the mobile phone 1A is changed from walking to a vehicle. The alarm includes that the travelling means of the user of the mobile phone 1A is changed from walking to a vehicle in a state where the short range wireless communication is disconnected. Due to this notification, it is possible to quickly notify the protector of a possibility that the protected person is abducted in a vehicle, when the travelling means of the protected person is changed from walking to a vehicle in a state where the mobile phone 1A and the mobile phone 1B are away from each other to such an extent that the short range wireless communication is not available and it is difficult for the protector to recognize the activity of the protected person with his/her eyes. The state in which it is difficult for the protector to recognize the activity of the protected person with his/her eyes also includes a case in which the protector cannot be close to the protected person even when the protector knows the activity schedule of the protected person. Also in this case, it is possible for the protector to recognize that the protected person acts in accordance with the schedule by the notification from the mobile phone 1A to the mobile phone 1B that the travelling means of the protected person is changed from walking to a vehicle.

The controller 10 does not cause the second communicator 6b to notify the mobile phone 1B of the alarm if the first communicator 6a and the mobile phone 1B are performing the short range wireless communication when it is determined that the travelling means of the user is changed from walking to a vehicle. Due to this configuration, it is possible to avoid troublesomeness caused by alarming excessively in a state where the mobile phone 1A and the mobile phone 1B are close to each other to such an extent that the short range wireless communication is available and the protector can recognize the activity of the protected person with his/her eyes. As the state where the protector can recognize the activity of the protected person with his/her eyes, there is considered a case in which the protector and the protected person are in the same vehicle together, and a case in which the protector is close to the protected person before the protected person travels by a public transportation such as a train or a bus or an automobile of an acquaintance of the protector, for example. Also, in a case in which the protected person is abducted by a vehicle in a state where the protector can recognize the activity of the protected person with his/her eyes, it is considered that the protector recognizes the abduction of the protected person without any alarm from the mobile phone 1A to the mobile phone 1B. In this case, without the alarm, it is possible for the protector to appropriately and quickly take measures against the abduction of the protected person, for example, by calling the police by the mobile phone 1B of the protector. Therefore, it is possible to further improve the security function of the mobile communication device for the protected person.

Figure 5:
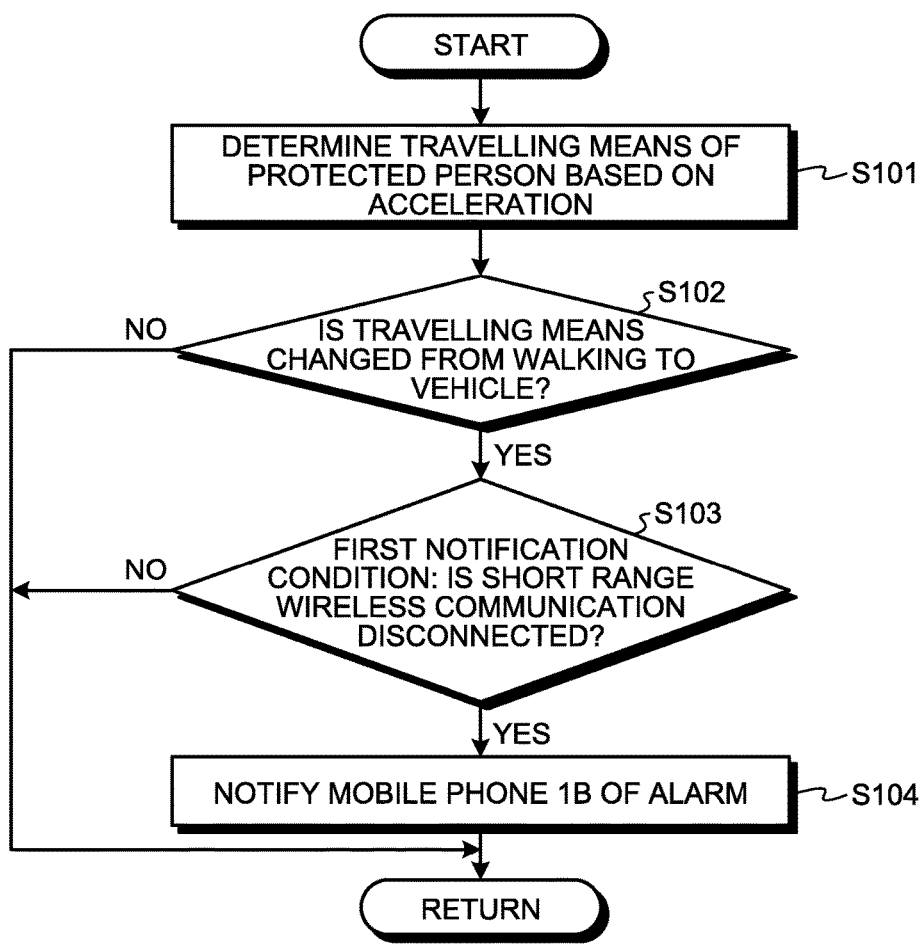
FIG. 5 is a flowchart illustrating an example of a process procedure of alarm notification by a mobile phone.

Next, with reference to FIG. 5, there is described a process procedure when the alarm is notified from the mobile phone 1A to the mobile phone 1B. FIG. 5 is a flowchart illustrating an example of a process procedure of alarm notification by the mobile phone 1A. The process procedure illustrated in FIG. 5 is realized by periodical execution of the control program 9a by the controller 10 at each predetermined time.

As illustrated in FIG. 5, as Step S101, the controller 10 of the mobile phone 1A determines the state of the mobile phone 1A, that is, the travelling means of the protected person who is the user of the mobile phone 1A based on the acceleration data 9b. Specifically, the controller 10 compares the acceleration pattern in the acceleration data 9b and acceleration patterns in the determination data 9c, and determines the state of the matched acceleration pattern as the state of the mobile phone 1A (the travelling means of the protected person). Subsequently, the controller 10 proceeds to Step S102.

As Step S102, the controller 10 determines whether the state of the mobile phone 1A is changed from walking (a walking state or a running state) to a vehicle, that is, the travelling means of the protected person is changed from walking (a walking state or a running state) to a vehicle. For example, it is determined whether the travelling means of the protected person is changed from walking to a vehicle, based on a comparison of the present state of the mobile phone 1A with the last state of the mobile phone 1A determined at Step S101 in the last execution of the present routine.

When it is determined that the travelling means of the protected person is changed from walking to a vehicle (Yes at Step S102), the controller 10 proceeds to Step S103. At Step S103, the controller 10 determines whether the first notification condition is established, that is, whether the short range wireless communication between the first communicator 6a and the mobile phone 1B is disconnected.

When it is determined that the short range wireless communication between the first communicator 6a and the mobile phone 1B is disconnected (Yes at Step S103), it is considered that there is a possibility of the abduction of the protected person by a vehicle. In this case, the controller 10 proceeds to Step S104. As Step S104, the controller 10 causes the second communicator 6b to notify the mobile phone 1B of the alarm. Thereafter, the controller 10 ends the present routine, and performs the processes at Step S101 and the subsequent steps again.

When it is determined that the travelling means of the protected person is not changed from walking to a vehicle (No at Step S103), it is considered that there is no possibility of the abduction of the protected person by a vehicle. In this case, the controller 10 omits the processes at Step S103 and the subsequent steps, and ends the present routine without causing the second communicator 6b to notify the mobile phone 1B of the alarm. Thereafter, the controller 10 performs the processes at Step S101 and the subsequent steps again. When it is determined that the first communicator 6a and the mobile phone 1B are performing the short range wireless communication (No at Step S103), it is considered that the protector can recognize the activity of the protected person. In this case, the controller 10 omits the process at Step S104 and ends the present routine without causing the second communicator 6b to notify the mobile phone 1B of the alarm. Thereafter, the controller 10 performs the processes at Step S101 and the subsequent steps again.

In the present embodiment, the notification condition stored in the notification condition data 9d includes the disconnection of the short range wireless communication between the first communicator 6a of the mobile phone 1A and the mobile phone 1B as the first notification condition. However, the notification condition may include a plurality of other notification conditions in addition to the first notification condition. In this case, the mobile phone 1A can be provided with a function of setting of the other notification conditions as an effective condition by the protected person who is the user or the protector. Contents of the other notification conditions and control of the mobile phone 1A when the other notification condition is set to be effective are described below.

The notification conditions stored in the notification condition data 9d can include a notification condition that an elapsed time t after the disconnection of the short range wireless communication between the first communicator 6a and the mobile phone 1B exceeds a predetermined time tref as a second notification condition. Also, the notification conditions stored in the notification condition data 9d can include a notification condition that the number of the steps W of the protected person after the disconnection of the short range wireless communication between the first communicator 6a and the mobile phone 1B exceeds a predetermined number of steps Wref as a third notification condition.

The predetermined time tref of the second notification condition is set as a time that is considered to be required from the separation of the protected person from the protector to such an extent that the short range wireless communication between the first communicator 6a of the mobile phone 1A and the mobile phone 1B is disconnected to the change of the travelling means of the protected person from walking to a vehicle when the protector knows in advance that the protected person separates from the protector and boards a vehicle. For example, the predetermined time tref is a time that is considered to be required from a time of the disconnection of the short range wireless communication described above to a time of boarding a train or a bus of the protected person, after the protected person is sent off by the protector at a gate in a station, an entrance of a bus terminal, or the like.

The predetermined time tref is set for each type of a vehicle. Due to this setting, it is possible to appropriately set the predetermined time tref while taking a waiting time of a vehicle, a distance from a place where the protected person separates from the protector (a station gate, an entrance of a bus terminal, or the like) to the vehicle, and the like into consideration. For example, when the vehicle is a train, it is considered that a distance by which the protected person must move after separating from the protector is mostly longer than that when the vehicle is a bus. Therefore, when the vehicle is a train, the predetermined time tref may be set to be longer than that when the vehicle is a bus. The predetermined time tref may be set to the same value for all vehicles. The predetermined time tref may be freely set by the protected person or the protector, or may be set in advance.

When the elapsed time t from the disconnection of the short range wireless communication between the first communicator 6a and the mobile phone 1B to the change of the travelling means of the protected person from walking to a vehicle does not exceed the predetermined time tref, the protector can expect that the protected person has boarded, by setting the predetermined time tref in this manner. Meanwhile, when the elapsed time t from the disconnection of the short range wireless communication between the first communicator 6a and the mobile phone 1B to the change of the travelling means of the protected person from walking to a vehicle exceeds the predetermined time tref, the protector cannot expect that the protected person has boarded, and there is a possibility of abduction of the protected person by a vehicle.

The predetermined number of the steps Wref of the third notification condition is set as the number of the steps that is considered to be required from the separation of the protected person from the protector to such an extent that the short range wireless communication between the first communicator 6a of the mobile phone 1A and the mobile phone 1B is disconnected to the change of the travelling means of the protected person from walking to a vehicle when the protector knows in advance that the protected person separates from the protector and boards a vehicle. For example, the predetermined number of the steps Wref is the number of the steps that is considered to be required from a time of the disconnection of the short range wireless communication described above to a time of boarding a train or a bus of the protected person, after the protected person is sent off by the protector at a gate in a station, an entrance of a bus terminal, or the like.

The predetermined number of the steps Wref is set for each type of a vehicle. Due to this setting, it is possible to appropriately set the predetermined number of the steps Wref while taking a waiting time of a vehicle, a distance from a place where the protected person separates from the protector (a station gate, an entrance of a bus terminal, or the like) to the vehicle, and the like into consideration. For example, when the vehicle is a train, it is considered that a distance by which the protected person must move after separating from the protector is mostly longer than that when the vehicle is a bus. Therefore, when the vehicle is a train, the predetermined number of the steps Wref may be set to be more than that when the vehicle is a bus. The predetermined number of the steps Wref may be set to the same for all vehicles. The predetermined number of the steps Wref may be freely set by the protected person or the protector, or may be set in advance.

When the number of the steps W from the disconnection of the short range wireless communication between the first communicator 6a and the mobile phone 1B to the change of the travelling means of the protected person from walking to a vehicle does not exceed the predetermined number of the steps Wref, the protector can expect that the protected person has boarded, by setting the predetermined number of the steps Wref in this manner. Meanwhile, when the number of the steps W from the disconnection of the short range wireless communication between the first communicator 6a and the mobile phone 1B to the change of the travelling means of the protected person from walking to a vehicle exceeds the predetermined number of the steps Wref, the protector cannot expect that the protected person has boarded, and there is a possibility of abduction of the protected person by a vehicle. By using the number of the steps W of the protected person as a reference of the determination whether the protector can expect that the protected person has boarded, it is possible to reduce influence of the waiting time of the vehicle on the determination.

The following descriptions explain the control of the mobile phone 1A when both the second notification condition and the third notification condition are effective.

In this case, the controller 10 causes the second communicator 6b to notify the mobile phone 1B of the alarm if the short range wireless communication between the first communicator 6a and the mobile phone 1B is disconnected, the elapsed time t after the disconnection of that short range wireless communication exceeds the predetermined time tref, and the number of the steps W of the protected person after the disconnection of that short range wireless communication exceeds the predetermined number of the steps Wref, when it is determined that the travelling means of the protected person is changed from walking to a vehicle based on the acceleration detected by the acceleration sensor 15. Due to this configuration, it is possible to quickly notify the protector of a possibility of abduction of the protected person by a vehicle in a state in which it is difficult for the protector to recognize the activity of the protected person with his/her eyes and to expect that the protected person has boarded.

The controller 10 does not cause the second communicator 6b to notify the mobile phone 1B of the alarm if the first communicator 6a and the mobile phone 1B are performing the short range wireless communication, or if the elapsed time t after the disconnection of the short range wireless communication does not exceed the predetermined time tref, or if the number of the steps W of the protected person after the disconnection of the short range wireless communication does not exceed the predetermined number of the steps Wref, when it is determined that the travelling means of the protected person is changed from walking to a vehicle based on an acceleration detected by the acceleration sensor 15. Due to this configuration, the mobile phone 1A is configured not to notify the mobile phone 1B of the alarm not only in the state in which the protector can recognize the activity of the protected person with his/her eyes but also in the state in which the protector can expect that the protected person has boarded, thereby troublesomeness caused by alarming excessively can be avoided more satisfactorily.

Figure 6:
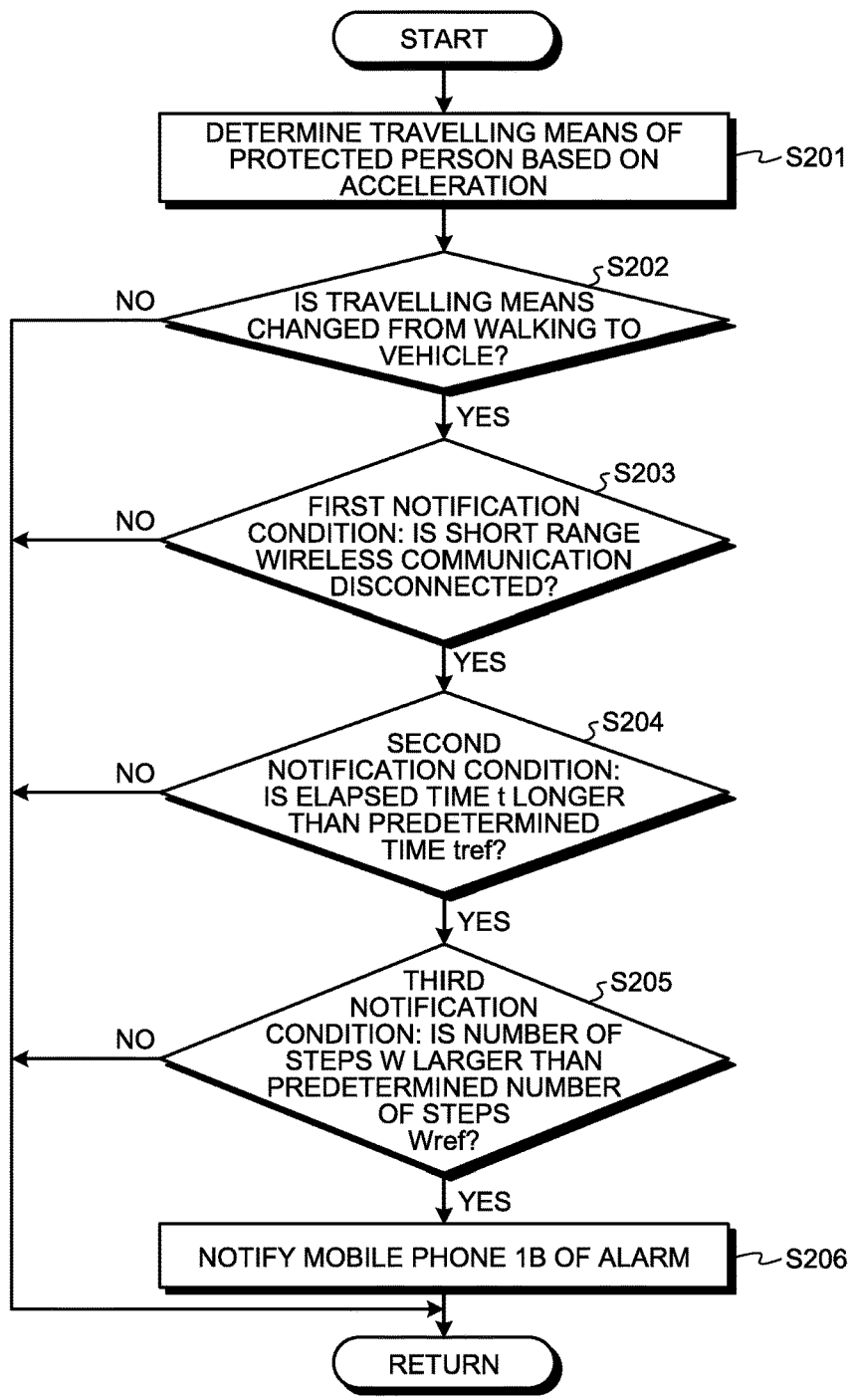
FIG. 6 is a flowchart illustrating an example of a process procedure of the alarm notification by the mobile phone when a second notification condition and a third notification condition are established.

Next, with reference to FIG. 6, there is described a process procedure when the mobile phone 1A notifies the mobile phone 1B of the alarm when the second notification condition and the third notification condition are effective. FIG. 6 is a flowchart illustrating an example of a process procedure of the alarm notification by the mobile phone 1A when the second notification condition and the third notification condition are effective. The process procedure illustrated in FIG. 6 is realized by the periodical execution of the control program 9a by the controller 10 at each predetermined time. Because the processes from Step S201 to Step S203 in the process procedure illustrated in FIG. 6 are identical to those from Step S101 to Step S103 in the process procedure illustrated in FIG. 5, descriptions thereof are omitted.

At Step S203, when it is determined that short range wireless communication between the first communicator 6a and the mobile phone 1B is disconnected (Yes at Step S203), the controller 10 proceeds to Step S204. As Step S204, the controller 10 determines whether the second notification condition is established, that is, whether the elapsed time t after the disconnection of the short range wireless communication between the first communicator 6a and the mobile phone 1B exceeds the predetermined time tref.

When it is determined that the elapsed time t after the disconnection of the short range wireless communication between the first communicator 6a and the mobile phone 1B exceeds the predetermined time tref (Yes at Step S204), the controller 10 proceeds to Step S205. As Step S205, the controller 10 determines whether the third notification condition is established, that is, whether the number of the steps W of the protected person after the disconnection of the short range wireless communication between the first communicator 6a and the mobile phone 1B exceeds the predetermined number of the steps Wref.

When it is determined that the number of the steps W of the protected person after the disconnection of the short range wireless communication between the first communicator 6a and the mobile phone 1B exceeds the predetermined number of the steps Wref (Yes at Step S205), it is considered that there is a possibility of abduction of the protected person by a vehicle. In this case, the controller 10 proceeds to Step S206. As Step S206, the controller 10 causes the second communicator 6b to notify the mobile phone 1B of the alarm. Thereafter, the controller 10 ends the present routine, and performs the processes at Step S201 and the subsequent steps again.

When it is determined that the elapsed time t after the disconnection of the short range wireless communication between the first communicator 6a and the mobile phone 1B does not exceed the predetermined time tref (No at Step S204), and when it is determined that the number of the steps W of the protected person after the disconnection of that the short range wireless communication does not exceed the predetermined number of the steps Wref (No at Step S205), it is considered that the protector knows in advance that the protected person separates away from the protector and boards a vehicle. In this case, the controller 10 ends the present routine without causing the second communicator 6b to notify the mobile phone 1B of the alarm, and performs the processes at Step S201 and the subsequent steps again.

In the process procedure illustrated in FIG. 6, either one of the processes at Steps S204 and S205 can be performed before the other. In the process procedure illustrated in FIG. 6, one of the processes at Steps S204 and S205 may be performed and the other may be omitted. That is, at least one of the second notification condition and the third notification condition described above may be effective.

In the present embodiment, the notification conditions stored in the notification condition data 9d can include the following conditions in addition to the first notification condition to the third notification condition. The notification conditions can include, as a fourth notification condition, a condition that the type of the vehicle determined by the controller 10 based on the acceleration detected by the acceleration sensor 15 does not correspond to the type of the vehicle that is set not to require the alarm notification. The notification condition can include, as a fifth notification condition, a condition that the first communicator 6a of the mobile phone 1A and a mounted communication device (second communication device) mounted on a vehicle are not performing the short range wireless communication. The notification condition can include, as a sixth notification condition, a condition that the first communicator 6a of the mobile phone 1A and a communication device that performs data communication required before the protected person boards a vehicle (third communication device) have not performed the short range wireless communication.

Examples of the type of the vehicle of the fourth notification condition that is set not to require the alarm notification includes, but are not limited to a train, which is considered not to be used for abduction. The type of the vehicle that is set not to require the alarm notification may be freely set by the protector or the protected person, or may be set in advance. It can be considered that there is a small possibility of abduction when the protected person is in the vehicle of the set type of the vehicle, and that there is a possibility of abduction when the protected person is in a vehicle other than the set type of the vehicle.

The mounted communication device mounted on the vehicle of the fifth notification condition is a communication device configured to perform communication such as transmission and reception of data and calling through the short range wireless communication. Examples of the communication standards of the short range wireless communication supported by the mounted communication device include, but are not limited to, IEEE802.11, Bluetooth (registered trademark), IrDA (Infrared Data Association), NFC (Near Field Communication), WPAN (Wireless Personal Area Network), etc. Examples of the WPAN include, but are not limited to, ZigBee (registered trademark), etc. The mounted communication device can support one or plural communication standards described above. Examples of the mounted communication device include, but are not limited to, a communication device that is mounted on a bus and can communicate with the first communicator 6a of the mobile phone 1A with WiFi (registered trademark), a communication device that is mounted on a bicycle and is individually registered in the first communicator 6a of the mobile phone 1A to communicate therewith with Bluetooth (registered trademark), etc.

When such a mounted communication device mounted on the vehicle and the first communicator 6a of the mobile phone 1A are performing the communication, it can be considered that the protected person is in a vehicle that the protected person normally boards and is familiar with, and there is a small possibility of abduction of the protected person by a vehicle. On the other hand, when the mounted communication device and the first communicator 6a of the mobile phone 1A are not performing the communication, it is likely that the protected person is in a vehicle that the protected person does not normally boards. Therefore, it can be considered that there is a possibility of abduction of the protected person by a vehicle.

The communication device for the data communication required before the protected person boards a vehicle, which corresponds to the sixth notification condition, is configured to perform communication such as transmission and reception of data and calling through the short range wireless communication. Examples of the communication standards of the short range wireless communication supported by the communication device for the data communication include, but are not limited to, IEEE802.11, Bluetooth (registered trademark), IrDA (Infrared Data Association), NFC (Near Field Communication), WPAN (Wireless Personal Area Network), etc. Examples of the WPAN include, but are not limited to, ZigBee (registered trademark), etc. The communication device for the data communication can support one or plural communication standards described above. Examples of the communication device for the data communication include, but are not limited to, an automatic ticket gate device with a function of FeliCa (registered trademark) at a gate in a station, an external device for fare processing provided in a bus, an external device used for boarding on an airplane, an electronic authentication key of a bicycle, etc.

After such a communication device for the data communication and the first communicator 6a of the mobile phone 1A have communicated with each other, it can be considered that the protected person is in a vehicle of his own will and there is a small possibility of abduction by a vehicle. On the other hand, when the protected person is in a vehicle although the communication device for the data communication and the first communicator 6a of the mobile phone 1A have not communicated with each other, there is a possibility that the protected person is in the vehicle not of his own will. Therefore, it can be considered that there is a possibility of abduction of the protected person by a vehicle.

The following descriptions explain the control of the mobile phone 1A when the fourth notification condition to the sixth notification condition described above are individually effective.

The control of the mobile phone 1A when the fourth notification condition is set to be effective is described. In this case, the controller 10 causes the second communicator 6b to notify the mobile phone 1B of the alarm if the short range wireless communication between the first communicator 6a and the mobile phone 1B is disconnected, and the type of the vehicle which the protected person is on board of does not correspond to the type of the vehicle that is set not to require the alarm notification, when it is determined that the travelling means of the protected person is changed from walking to a vehicle based on the acceleration detected by the acceleration sensor 15. Due to this configuration, it is possible to quickly notify the protector of a possibility of abduction of the protected person by a vehicle, in a state where it is difficult for the protector to recognize the activity of the protected person with his/her eyes and a possibility of abduction of the protected person by a vehicle is considered not to be small.

The controller 10 causes the second communicator 6b not to notify the mobile phone 1B of the alarm when it is determined that the travelling means of the protected person is changed from walking to a vehicle based on the acceleration detected by the acceleration sensor 15, and the first communicator 6a and the mobile phone 1B are performing the short range wireless communication, or the vehicle which the protected person is on board of corresponds to the type of the vehicle that is set not to require the alarm notification. Due to this configuration, it is possible to cause the mobile phone 1A not to notify the mobile phone 1B of the alarm when a possibility of abduction of the protected person by a vehicle is small, in addition to the state in which the protector can recognize the activity of the protected person with his/her eyes. As a result, it is possible to avoid troublesomeness caused by alarming excessively more satisfactorily.

The control of the mobile phone 1A when the fifth notification condition is set to be effective is described. In this case, the controller 10 causes the second communicator 6b to notify the mobile phone 1B of the alarm if the short range wireless communication between the first communicator 6a and the mobile phone 1B is disconnected, and the first communicator 6a of the mobile phone 1A and a mounted communication device (second communication device) mounted on a vehicle are not performing the short range wireless communication, when it is determined that the travelling means of the protected person is changed from walking to a vehicle based on the acceleration detected by the acceleration sensor 15. Due to this configuration, it is possible to quickly notify the protector of a possibility of abduction of the protected person by a vehicle, in a state in which it is difficult for the protector to recognize the activity of the protected person with his/her eyes and when there is a possibility that the protected person is in a vehicle that the protected person does not normally boards.

The controller 10 causes the second communicator 6b not to notify the mobile phone 1B of the alarm if the first communicator 6a and the mobile phone 1B are performing the short range wireless communication or if the first communicator 6a of the mobile phone 1A and the mounted communication device mounted on the vehicle are performing the short range wireless communication, when it is determined that the travelling means of the protected person is changed from walking to a vehicle based on the acceleration detected by the acceleration sensor 15. Due to this configuration, it is possible to cause the mobile phone 1A not to notify the mobile phone 1B of the alarm when the protected person is in a vehicle that the protected person normally boards and is familiar with, and there is a small possibility of abduction by a vehicle, in addition to the state in which the protector can recognize the activity of the protected person with his/her eyes. As a result, it is possible to avoid troublesomeness caused by alarming excessively more satisfactorily.

The control of the mobile phone 1A when the sixth notification condition is set to be effective is described. In this case, the controller 10 causes the second communicator 6b to notify the mobile phone 1B of the alarm if the short range wireless communication between the first communicator 6a and the mobile phone 1B is disconnected, and the first communicator 6a of the mobile phone 1A and a communication device for the data communication required before boarding have not performed the short range wireless communication, when it is determined that the travelling means of a protected person is changed from walking to a vehicle based on the acceleration detected by the acceleration sensor 15. Due to this configuration, it is possible to quickly notify the protector of a possibility of abduction of the protected person by a vehicle in a state in which it is difficult for the protector to recognize the activity of the protected person with his/her eyes and there is a possibility that the protected person is in the vehicle not of his own will.

The controller 10 causes the second communicator 6b not to notify the mobile phone 1B of the alarm if the first communicator 6a and the mobile phone 1B are performing the short range wireless communication or if the first communicator 6a of the mobile phone 1A and the communication device for the data communication required before boarding have performed the short range wireless communication, when it is determined that the travelling means of the protected person is changed from walking to a vehicle based on the acceleration detected by the acceleration sensor 15. Due to this configuration, it is possible to cause the mobile phone 1A not to notify the mobile phone 1B of the alarm in a state in which the protected person is in a vehicle of his own will and there is a small possibility of abduction by a vehicle, in addition to a state in which the protector can recognize the activity of the protected person with his/her eyes. As a result, it is possible to avoid troublesomeness caused by alarming excessively more satisfactorily.

The second notification condition to the sixth notification condition described above may be all effective. In this case, the controller 10 causes the second communicator 6b to notify the mobile phone 1B of the alarm if the second notification condition to the sixth notification condition are all established, when it is determined that the travelling means of the protected person is changed from walking to a vehicle based on the acceleration detected by the acceleration sensor 15. Due to this configuration, it is possible to quickly notify the protector of a possibility of abduction of the protected person by a vehicle. The controller 10 causes the second communicator 6b not to notify the mobile phone 1B of the alarm if it is determined that any of the second notification condition to the sixth notification condition is not established, when it is determined that the travelling means of the protected person is changed from walking to a vehicle based on the acceleration detected by the acceleration sensor 15. Due to this configuration, it is possible to avoid troublesomeness caused by alarming excessively more satisfactorily.

Figure 7:
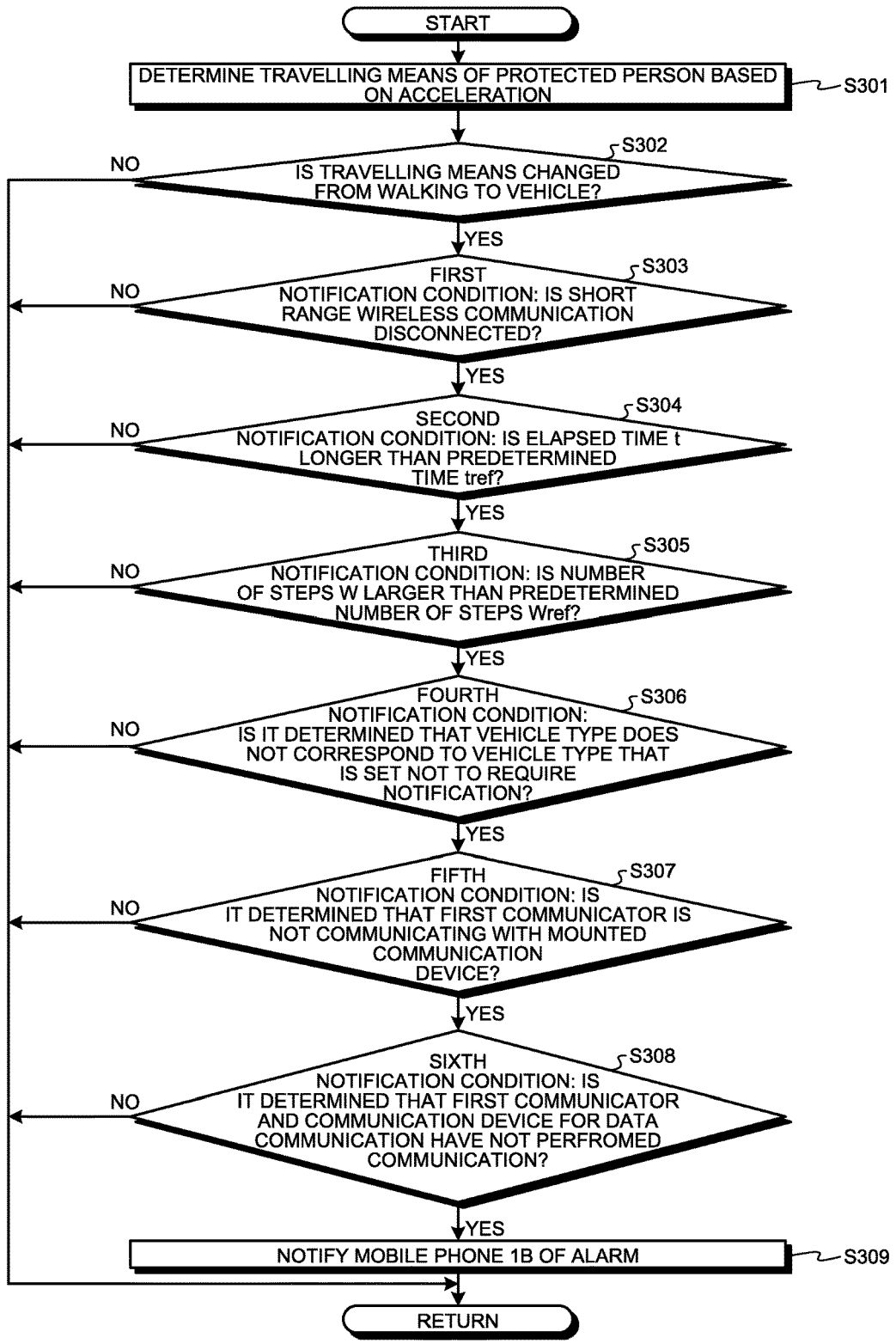
FIG. 7 is a flowchart illustrating an example of a process procedure of the alarm notification by the mobile phone when all notification conditions from the second notification condition to a sixth notification condition are effective.

Next, with reference to FIG. 7, there is described a process procedure when the alarm is notified from the mobile phone 1A to the mobile phone 1B when the second notification condition to the sixth notification condition are all effective. FIG. 7 is a flowchart illustrating an example of a process procedure of the alarm notification by the mobile phone 1A when the second notification condition to the sixth notification condition are all effective. The process procedure illustrated in FIG. 7 is realized by the periodical execution of the control program 9a by the controller 10 at each predetermined time. Because the processes from Step S301 to Step S305 in the process procedure illustrated in FIG. 7 are identical to those from Step S201 to Step S205 in the process procedure illustrated in FIG. 6, descriptions thereof are omitted.

At Step S305, when it is determined that the number of the steps W of the protected person after the disconnection of the short range wireless communication exceeds the predetermined number of the steps Wref (Yes at Step S305), the controller 10 proceeds to Step S306. At Step S306, the controller 10 determines whether the fourth notification condition is established, that is, whether the type of the vehicle which the protected person is on board of does not correspond to the type of the vehicle that is set not to require the alarm notification.

When it is determined that the type of the vehicle which the protected person is on board of does not correspond to the type of the vehicle that is set not to require the alarm notification (Yes at Step S306), the controller 10 proceeds to Step S307. At Step S307, the controller 10 determines whether the fifth notification condition is established, that is, whether the first communicator 6a is performing the short range wireless communication with a mounted communication device mounted in the vehicle.

When it is determined that the first communicator 6a is not performing the short range wireless communication with the mounted communication device mounted in the vehicle (Yes at Step S307), at Step S308, the controller 10 determines whether the sixth notification condition is established, that is, whether the first communicator 6a and the communication device for the data communication required before boarding have not performed the short range wireless communication.

When it is determined that the first communicator 6a and the communication device for the data communication required before boarding have not performed the short range wireless communication (Yes at Step S308), the controller 10 proceeds to Step S309. At Step S309, the controller 10 causes the second communicator 6b to notify the mobile phone 1B of the alarm. Thereafter, the controller 10 ends the present routine, and performs the processes at Step S301 and the subsequent steps again.

It is considered that a possibility of abduction of the protected person by a vehicle is small when it is determined that type of the vehicle which the protected person is on board of corresponds to type of the vehicle that is set not to require the alarm notification (No at Step S306), when it is determined that the first communicator 6a is performing the short range wireless communication with the mounted communication device mounted on the vehicle (No at Step S307), and when it is determined that the first communicator 6a and the communication device used for the data communication required before boarding have performed the short range wireless communication (No at Step S308). In these cases, the controller 10 omits the subsequent processes, ends the present routine without causing the second communicator 6b to notify the mobile phone 1B of the alarm, and performs the processes at Step S301 and the subsequent steps again.

In the process procedure illustrated in FIG. 7, the processes from Steps S304 to S308 may be performed in any order. The processes at Steps S304 and S305 may be omitted in the process procedure illustrated in FIG. 7. That is, it is not necessary that the second notification condition and the third notification condition described above are effective. At least one of the processes from Steps S306 to S308 may be performed in the process procedure illustrated in FIG. 7. That is, at least one of the fourth notification condition to the sixth notification condition described above may be effective.

In the above embodiments, a mobile phone has been described as an example of the mobile communication device; however, the mobile communication device according to the present application is not limited to a mobile phone. The mobile communication device according to the present application may be some other mobile electronic device other than a mobile phone. Examples of the mobile communication device include, but are not limited to, a smartphone, a tablet, a mobile personal computer, a digital camera, a media player, an electronic book reader, a navigator, a gaming machine, etc.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A mobile communication device comprising:
   a first communicator configured to perform short range wireless communication with a first communication device not via another device;
   a second communicator configured to perform wireless communication with the first communication device via another device;
   an acceleration sensor configured to detect acceleration values; and
   at least one controller configured to,
   in response to a determination that a travelling means of a user of the mobile communication device is changed from walking to a vehicle based on acceleration pattern that includes the acceleration values measured over time,
      determine whether a notification condition, which includes a condition that communication between the first communicator and the first communication device is disconnected, is established,
   when it is determined that the travelling means of the user of the mobile communication device is changed from walking to the vehicle based on the acceleration pattern, and in response to a determination that the notification condition is established,
      cause the second communicator to notify the first communication device of an alarm, and
   when it is determined that the travelling means of the user of the mobile communication device is changed from walking to the vehicle based on the acceleration pattern, and in response to a determination that the notification condition is not established,
      cause the second communicator not to notify the first communication device of the alarm.

2. The mobile communication device according to claim 1, wherein
   the notification condition includes a condition that an elapsed time after disconnection of the communication between the first communicator and the first communication device exceeds a predetermined time.

3. The mobile communication device according to claim 2, wherein
   the at least one controller is further configured to determine a type of a vehicle which the user is on board of based on the acceleration value detected by the acceleration sensor, and the predetermined time is set in accordance with the determined type of the vehicle.

4. The mobile communication device according to claim 1, wherein
the at least one controller is further configured to calculate number of steps of the user, and
the notification condition includes a condition that the number of steps of the user after the disconnection of the communication between the first communicator and the first communication device exceeds a predetermined number of steps.

5. The mobile communication device according to claim 4, wherein
the at least one controller is further configured to determine a type of a vehicle which the user is on board of based on the acceleration value detected by the acceleration sensor, and
the predetermined number of steps is set in accordance with the determined type of the vehicle.

6. The mobile communication device according to claim 1, wherein
the at least one controller is further configured to determine a type of a vehicle the user is on board of based on the acceleration value detected by the acceleration sensor, and
the notification condition includes a condition that the determined type of the vehicle does not correspond to a type of the vehicle that is set not to require notification of the alarm.

7. The mobile communication device according to claim 1, wherein
the first communicator is further configured to perform the short range wireless communication with a second communication device mounted on the vehicle not via another device, and
the notification condition includes a condition that the first communicator and the second communication device are not performing the communication.

8. The mobile communication device according to claim 1, wherein
the first communicator is further configured to perform the short range wireless communication with a third communication device that performs data communication required before the user is on board not via another device, and
the notification condition includes a condition that the first communicator and the third communication device have not performed the communication.

9. The mobile communication device according to claim 1, wherein
the acceleration values measured over time comprise acceleration values measured over time in an X-direction, acceleration values measured over time in a Y-direction, and acceleration values measured over time in a Z-direction, and
the acceleration pattern is synthesized by combining the acceleration values in the X-direction, the acceleration values in the Y-direction and the acceleration values in the Z-direction.

10. The mobile communication device according to claim 1, wherein
when it is determined that the travelling means of the user of the mobile communication device is changed from walking to the vehicle based on the acceleration pattern, and in response to a determination that the communication between the first communicator and the first communication device is disconnected,
the controller is configured to determine whether an elapsed time after a disconnection of the communication between the first communicator and the first communication device exceeds a predetermined time.

11. The mobile communication device according to claim 10, wherein
when it is determined that the travelling means of the user of the mobile communication device is changed from walking to the vehicle based on the acceleration pattern, and in response to a determination that the elapsed time after the disconnection of the communication between the first communicator and the first communication device exceeds the predetermined time,
the controller is configured to determine whether a number of steps of the user exceeds a predetermined number of steps.

12. The mobile communication device according to claim 11, wherein
when it is determined that the travelling means of the user of the mobile communication device is changed from walking to the vehicle based on the acceleration pattern, and in response to a determination that the number of steps of the user after the disconnection of the communication between the first communicator and the first communication device exceeds the predetermined number of steps,
the controller is configured to cause the second communicator to notify the first communication device of the alarm.

13. The mobile communication device according to claim 1, wherein the at least one controller is configured to,
in response to the determination that the travelling means of the user of the mobile communication device is changed from the walking to the vehicle based on the acceleration pattern that includes the acceleration values measured over time,
automatically determine, without user's intervention, whether the notification condition is established.

14. A communication method executed by a mobile communication device including a first communicator configured to perform short range wireless communication with a first communication device not via another device, a second communicator configured to perform wireless communication with the first communication device via another device, and an acceleration sensor configured to detect acceleration values, the communication method comprising:
in response to a determination that a travelling means of a user is changed from walking to a vehicle based on acceleration pattern that includes the acceleration values measured over time, determining whether a notification condition, which includes a condition that communication between the first communicator and the first communication device is disconnected, is established;
when it is determined that the travelling means of the user of the mobile communication device is changed from walking to the vehicle based on the acceleration pattern, and in response to a determination that the notification condition is established, causing the second communicator to notify the first communication device of an alarm; and
when it is determined that the travelling means of the user is changed from walking to the vehicle based on the acceleration pattern, and in response to a determination that the notification condition is not established, causing the second communicator not to notify the first communication device of the alarm.

15. The communication method according to claim 14, wherein
the acceleration values measured over time comprise acceleration values measured over time in an X-direction, acceleration values measured over time in a Y-direction, and acceleration values measured over time in a Z-direction, and
the acceleration pattern is synthesized by combining the acceleration values in the X-direction, the acceleration values in the Y-direction and the acceleration values in the Z-direction.

16. A non-transitory storage medium that stores a control program for causing, when executed by a mobile communication device including a first communicator configured to perform short range wireless communication with a first communication device not via another device, a second communicator configured to perform wireless communication with the first communication device via another device, and an acceleration sensor configured to detect acceleration values, the mobile communication device to execute:
in response to a determination that a travelling means of a user is changed from walking to a vehicle based on acceleration pattern that includes the acceleration values measured over time, determining whether a notification condition, which includes a condition that communication between the first communicator and the first communication device is disconnected, is established;
when it is determined that the travelling means of the user of the mobile communication device is changed from walking to the vehicle based on the acceleration pattern, and in response to a determination that the notification condition is established, causing the second communicator to notify the first communication device of an alarm; and
when it is determined that the travelling means of the user is changed from walking to the vehicle based on the acceleration pattern, and in response to a determination that the notification condition is not established, causing the second communicator not to notify the first communication device of the alarm.

17. The non-transitory storage medium according to claim 16, wherein
the acceleration values measured over time comprise acceleration values measured over time in an X-direction, acceleration values measured over time in a Y-direction, and acceleration values measured over time in a Z-direction, and
the acceleration pattern is synthesized by combining the acceleration values in the X-direction, the acceleration values in the Y-direction and the acceleration values in the Z-direction.

* * * * *